United States Patent [19]

Damico

[11] 4,385,414
[45] May 31, 1983

[54] CASTER FOR ADJUSTABLE BEDS AND THE LIKE

[75] Inventor: Frank M. Damico, Hull, Wis.

[73] Assignee: Joerns Furniture Company, Stevens Point, Wis.

[21] Appl. No.: 194,383

[22] Filed: Oct. 6, 1980

[51] Int. Cl.³ .......................... B60B 33/00; B60T 1/04
[52] U.S. Cl. .................................... 16/35 R; 188/1.12
[58] Field of Search ................ 16/35 R, 35 D, 44, 32, 16/33, 35, 19, 18, 23, 28; 188/1.12, 176, 29

[56] References Cited

U.S. PATENT DOCUMENTS

| | | | |
|---|---|---|---|
| 2,889,153 | 6/1959 | Kowalik | 280/93 |
| 2,942,698 | 6/1960 | Bolinger | 188/176 |
| 3,162,888 | 12/1964 | Mobus | 16/35 R |
| 3,237,940 | 3/1966 | Johnson | 16/35 R |
| 3,279,567 | 10/1966 | Kempel | 188/176 |
| 3,636,586 | 1/1972 | Bollinger et al. | 188/1.12 X |
| 3,687,241 | 8/1972 | Fontana | 188/74 |
| 3,860,992 | 1/1975 | Legg | 16/35 R |
| 3,881,216 | 5/1975 | Fontana | 188/1.12 X |
| 3,902,576 | 9/1975 | Pitan | 188/29 X |
| 3,919,727 | 11/1975 | Paine | 5/63 |
| 4,077,087 | 3/1978 | Mooney | 188/1.12 X |
| 4,128,144 | 12/1978 | Vassar | 16/35 R X |

FOREIGN PATENT DOCUMENTS

27964  4/1964  German Democratic Rep. .... 16/35

*Primary Examiner*—Paul A. Bell
*Assistant Examiner*—John S. Brown
*Attorney, Agent, or Firm*—Price, Heneveld, Huizenga & Cooper

[57] ABSTRACT

A caster for vertically adjustable beds, and the like, includes a brake assembly for locking the wheel in place. A brake arm is pivotally mounted in the housing of the caster, and includes one end adapted to abut and frictionally engage the periphery of the caster wheel to form a rotary lock. The other end of the brake arm engages a vertically translating portion of the adjustable bed, and thereby rotates the brake arm between the locked and unlocked positions. A swivel lock is disposed between the caster housing and the bed leg, and is also actuated by vertical bed translation, whereby both caster swivel and rotation are automatically controlled by adjusting the elevation of the bed.

25 Claims, 9 Drawing Figures

CASTER FOR ADJUSTABLE BEDS AND THE LIKE

BACKGROUND OF THE INVENTION

The present invention relates to casters, and in particular to a caster and brake arrangement for vertically adjustable beds, tables, carts, and other similar structures.

Adjustable beds, such as those used in hospitals, nursing homes, and other similar institutions are typically supported on casters to facilitate moving the bed from one location to another. Such casters are usually provided with a brake mechanism to lock the caster wheels against rotation, and thereby retain the bed in a stationary position.

Heretofore, caster brakes of the above noted type have typically comprised a foot operated treadle mechanism. These locks are considered difficult to operate, and must be individually engaged for each of the casters. Further, such locks are designed only to halt rotation of the wheel in the caster housing, and do not prevent the caster from pivoting or swiveling with respect to the bed leg.

Some hospital-type beds, such as those disclosed in U.S. Pat. No. 3,919,727, are vertically adjustable, so that the patient may be raised and lowered to facilitate treatment, movement onto transport carts, and the like. Other similar articles, such as carts, tables, and the like, may also include vertical adjustment means to adapt the device for a particular application. These vertically adjustable beds typically include casters with treadle locks thereon, so that the bed can be locked in a stationary position during bed adjustment, patient transport, and other circumstances well known to those in the health care field.

SUMMARY OF THE INVENTION

One aspect of the present invention is to provide a caster having a brake assembly with a control arm pivotally mounted in a housing portion of the caster at a pivot point. The control arm has an interior end eccentric to the pivot point, and extends over the periphery of the wheel, and an exterior end which is laterally offset from the pivot point, and extends adjacent to the leg to which the caster is attached. Downward force is applied to the exterior end of the arm by a vertically translating portion of the bed, and rotates the interior end of the arm into abutment with the periphery of the wheel, and thereby securely locks the wheel in place. In this manner, when the bed is lowered to a fully down position, the caster wheels are automatically locked against rotation, and retain the bed in a stationary position.

Another aspect of the present invention is to provide a swivel lock for casters on vertically adjustable beds and the like. The swivel lock comprises a first plate keyed on a foot portion of the bed. A second plate is connected with the caster for pivoting therewith, and is disposed in vertical alignment with the first plate. The two plates have mating protuberances and recesses which selectively lock the plates together when they are converged into an abutting relationship. A spring normally retains the plates in a nonengaged position to permit pivotal motion therebetween. The upper plate is adapted for abutment with a vertically translating portion of the bed, whereby raising and lowering the bed simultaneously diverges and converges the plates between locked and unlocked positions. Hence, when the bed is lowered to the fully down position, the caster swivel or angular orientation is automatically locked into place.

Yet another aspect of the present invention is to provide a caster for vertically adjustable beds and the like, which has both a rotative brake for the caster wheel, and a swivel lock arrangement, which are automatically engaged by the lowering of the bed. The resilient means which retains the swivel lock in an unlocked position is preferably less stiff than the resilient means retaining the rotative lock in an unlocked position, whereby initial lowering of the bed causes the caster swivel to lock, while permitting wheel rotation, and continued bed descent engages the rotative brake.

The principal objects of the present invention are to provide a caster for adjustable beds, and the like, having a brake for securely locking the bed in position. The brake is particularly adapted for use in conjunction with vertically adjustable beds, and is operably connected thereto so that the rotative brake is automatically shifted between locked and unlocked positions when the elevation of the bed is adjusted. A swivel lock is also provided for the casters, to retain the same in a preselected angular orientation for secure anchoring of the bed or to facilitate steering. The swivel lock is also connected with a vertically translating portion of the bed and is manipulated thereby, such that both caster swivel and wheel rotation are automatically controlled by adjusting the elevation of the bed.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 2:
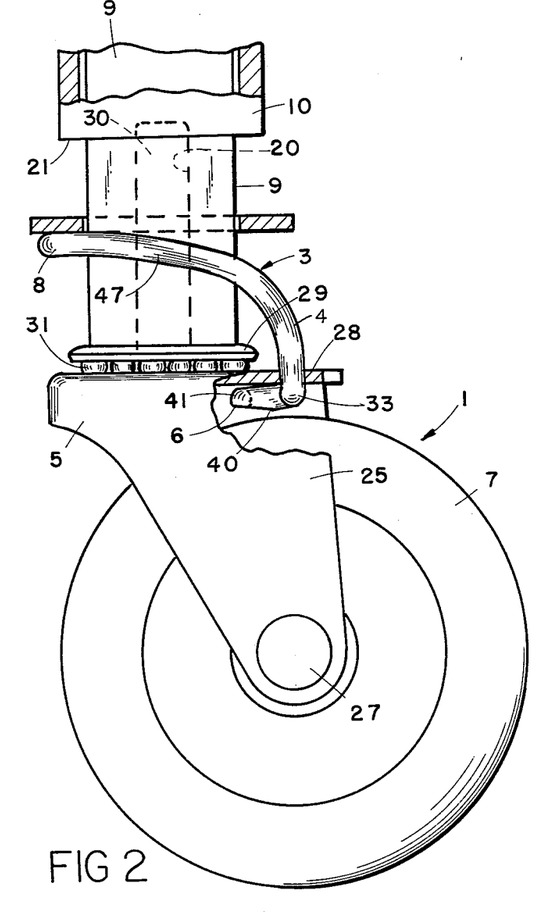
FIG. 2 is a side elevational view of the caster, shown mounted in a telescoping bed leg.

For purposes of description herein, the terms "upper", "lower", "right", "left", "rear", "front", "vertical", "horizontal", and derivatives thereof shall relate to the invention as oriented in FIG. 2. However, it is to be understood that the invention may assume various alternative orientations, except where expressly specified to the contrary.

Figure 1:
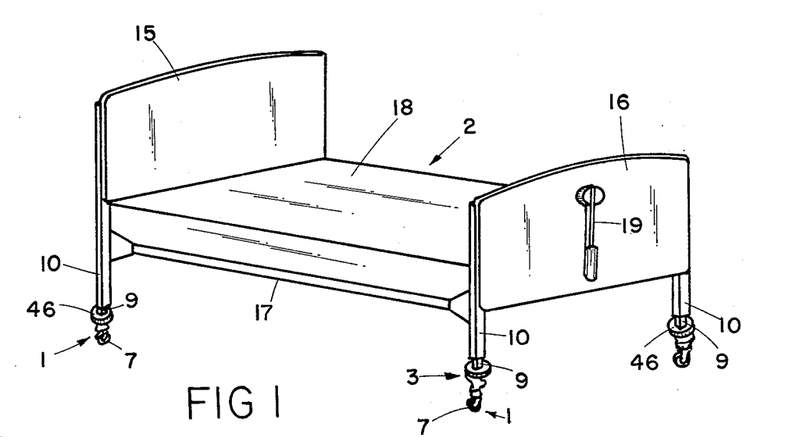
FIG. 1 is a perspective view of a vertically adjustable bed, having casters embodying the present invention attached thereto.

The reference numeral 1 (FIG. 1) generally designates a caster for vertically adjustable articles, such as bed 2, and includes a wheel brake assembly 3 for locking the caster in place. A brake arm 4 (FIGS. 2 and 3) is pivotally mounted in a housing portion 5 of the caster, and includes an eccentric interior end 6 which is adapted to abut and frictionally engage the periphery of the caster wheel 7. The exterior end 8 of brake arm 4 extends around a telescoping foot 9 of bed leg 10. Downward translation of bed leg 10 lowers the bed, and forces the exterior arm end 8 downwardly, thereby rotating the interior arm end into an abutting position against the periphery of the caster wheel 7 to lock the wheel in place. A swivel lock 11 (FIGS. 4–6) is positioned between caster housing 5 and bed leg 10, and is also actuated by vertical bed translation, whereby both the wheel rotation and swivel of the caster are automatically controlled by adjusting the elevation of bed 2.

Figure 3:
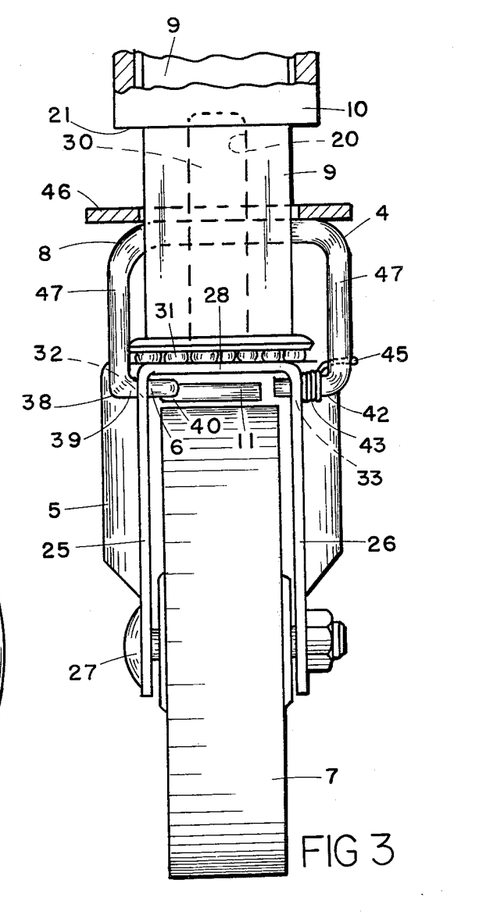
FIG. 3 is an end elevational view of the caster, shown mounted in a telescoping bed leg.

Caster 1 is particularly adapted for use in conjunction with vertically adjustable beds, and other similar devices. The illustrated bed 2 (FIG. 1) includes decorative head and footboards 15 and 16 attached to the upper ends of legs 10. Parallel side rails 17 interconnect the legs at the head and foot of the bed to form a frame on which a mattress 18 is supported. In this example, bed 2 is vertically adjustable by the extension and retraction of telescoping feet 9 which extend and retract relative to the associated leg 10. A control arm 19 is operably connected with and controls the positioning of the telescoping feet 9 by conventional means, such as cables, or the like (not shown). As best illustrated in FIGS. 2 and 3, each of the telescoping feet 9 includes an axially oriented aperture 20 therethrough for attaching the caster to the foot. Each foot 9 has a square, tubular shape, and is received telescopingly into a similarly shaped leg 10 with a lower edge 21.

With the exception of brake assembly 3, caster 1 has a conventional construction, wherein housing 5 (FIGS. 2 and 3) is of a rigid, formed sheet metal construction and has an inverted triangular shape with ground engaging wheel 7 rotatably mounted between a pair of depending flanges 25 and 26 at the lower apex thereof by an axle or through pin 27. A housing base 28 interconnects housing flanges 25 and 26 at the upper end of the housing, and includes an upper race 29 and an upstanding spindle 30 rotatably attached to the housing by a ball bearing arrangement 31. Spindle 30 is adapted to be received in foot aperture 20, and the lower edge 21 of the foot is abuttingly supported on upper race 29, thereby securely connecting the caster in the foot 9 in a manner which will permit the caster to pivot about the vertical axis of spindle 30. A pair of apertures 32 and 33 extend through the housing flanges 25 and 26 at the right-hand side of the housing (as viewed in FIG. 2) adjacent base 28 and are adapted to receive the ends of brake arm 4 therethrough to pivotally mount the brake arm in the housing.

Figure 5:
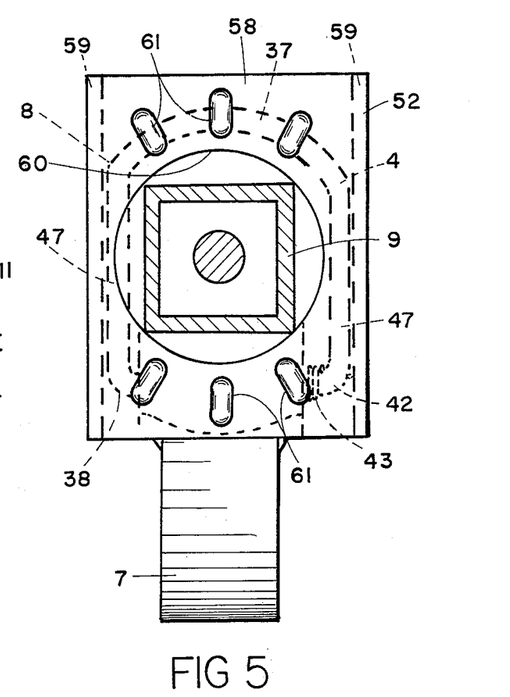
FIG. 5 is a horizontal cross-sectional view of the swivel lock caster shown in FIG. 4, taken along the line V—V, FIG. 4, with leaf spring members thereof removed for greater clarity.

Brake arm 4 has a formed wire construction and is pivotally mounted in the caster housing 5. The wire arm 4 can be heat treated or otherwise hardened so that it is extremely rigid and will retain its curved shape even under the application of substantial forces. As best illustrated in FIGS. 2, 3 and 5, the medial portion 37 of brake arm 4 is generally U-shaped from the top plan view, and extends around foot 9. The left-hand end 38 of brake arm 4 (as viewed in FIG. 3) includes a straight segment 39 extending through and rotatably received in housing aperture 32. The interior end 6 of brake arm 4 extends inwardly from straight segment 39, and includes an offset portion 40 extending perpendicularly thereto, and a flattened terminal segment 41 extending laterally across the housing above the wheel 7. The right-hand end 42 of brake arm 4 (as viewed in FIG. 3) is received and rotatably mounted in housing aperture 33, and is laterally aligned with segment 39 of the left-hand brake arm end. The flattened arm end 41 is thereby eccentric to the pivot point or axis at which the arm is mounted in the housing. A coil spring 43 is wrapped about the right-hand brake arm end 42, and has one end 44 attached to the housing base 28, and the other end 45 attached to the brake arm 4. Coil spring 43 is pretensed in a manner which rotates brake arm 4 upwardly and normally retains the same in a nonengaged position with caster wheel 7. Engagement between flattened arm segment 41 and the lower surface of housing base 28 forms a stop for arm 4 in the fully elevated position. As best illustrated in FIG. 2, the sides 47 of brake arm 4 are arcuately shaped (in side view) in the nature of a "J", such that the left-hand end thereof, which is furthest away from the pivot point, has the highest elevation. In the embodiment illustrated in FIGS. 2 and 3, a washer 46 is slideably mounted on the bed foot 9, and insures engagement between the leg 10 and brake arm 4 when the bed is lowered. Washer 46 has a circular periphery, and a square central aperture which mates with the shape of tubular foot 9. Washer 46 is abuttingly supported on brake arm 4. The arcuate or "J" shape of the arm sides 47 mates with the lower surface of washer 46, such that during abutment, arm 4 will be smoothly pivoted.

In use, when bed 2 is lowered, the bed legs 10 descend toward the floor and telescope over feet 9. As the bed descends, the lower edge 21 of leg 10 abuts washer 46, which in turn applies a downwardly directed force to the left-hand end of brake arm 4. The bed legs 10 are preferably designed so that abutment with washer 46 takes place just above the fully down position of the bed. The bed is normally adjusted to the fully down position when the bed is occupied. The force applied by the descending bed leg overcomes the force of coil spring 43 and rotates brake arm 4 downwardly, which in turn rotates the eccentric, flat interior arm segment 41 in the same rotational direction (counterclockwise as viewed in FIG. 2) into engagement with the periphery of caster wheel 7. When bed 2 is fully lowered, leg 10 applies sufficient force to brake arm 4 so as to securely lock the caster wheel 7 in place and prevent rotation of wheel 7 about pin 27. When the bed is elevated, such as when the patient is to be transported to a different location, the bed legs 10 lift upwardly off of washers 46, thereby releasing the downward force applied to brake arm 4. Coil spring 43 resiliently applies a lifting torque to brake arm 4, and returns the arm to the raised position, wherein the arm is disengaged from wheel 7.

Figure 4:
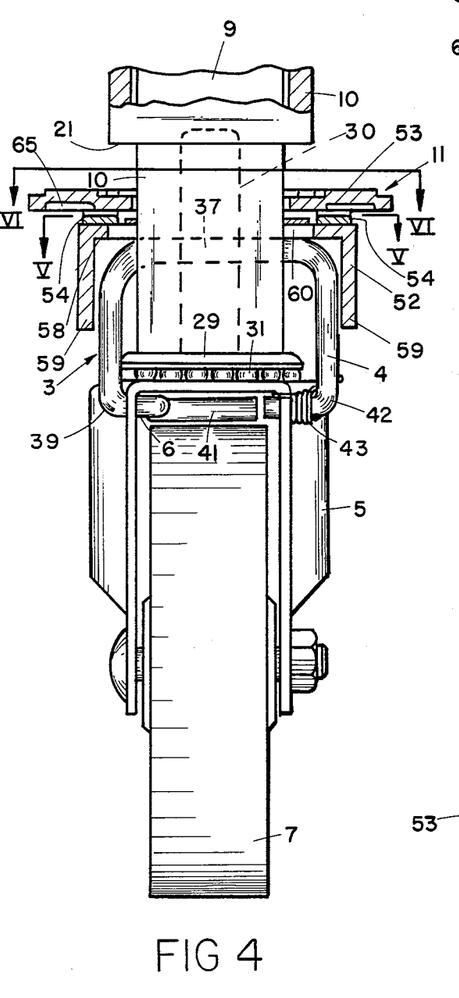
FIG. 4 is an end elevational view of another embodiment of the present invention, shown mounted in an adjustable leg, and including a swivel lock arrangement connected therewith.
Figure 6:
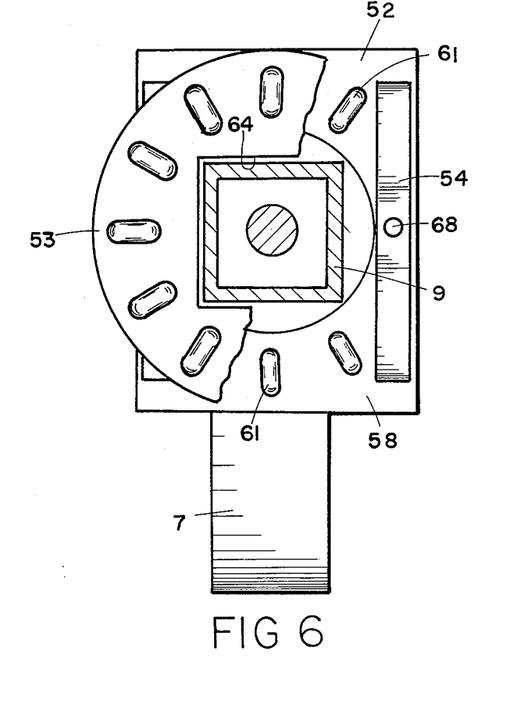
FIG. 6 is a horizontal cross-sectional view of the swivel lock caster shown in FIGS. 4 and 5, taken along the line VI—VI, FIG. 4, with portions of a pivot locking plate broken away to reveal internal construction.

In the embodiment illustrated in FIGS. 4–6, caster swivel lock 11 is provided to control the angular position or swivel of the caster in a horizontal plane. Since the caster wheel brake 3 is identical to the assembly described above and illustrated in FIGS. 1–3, the same reference numerals will be used for similar parts. Swivel lock 11 comprises a lower plate 52 which is operably connected with caster 1 and rotates therewith, and an upper plate 53 which is keyed on foot 9. Plates 52 and 53 are vertically aligned, and have adjacent faces with mating protrusions and recesses therein to selectively lock the plates together when the same are in a converged condition. A spring 54 resiliently urges the plates 52 and 53 apart to a nonengaged position to permit pivotal rotation therebetween. However, it is to be understood that upper plate 53 could be attached directly to the lower edge 21 of the bed leg 10, and spring 54 eliminated. In either case, the present invention contemplates that extension and retraction of telescoping foot 9 both raises and lowers the bed, and simultaneously diverges and converges the plates 52 and 53 between the engaged and nonengaged positions.

As best illustrated in FIGS. 4 and 5, the lower plate 52 comprises a U-shaped channel having a base 58, and a pair of parallel, depending flanges 59. Flanges 59 are spaced apart a predetermined amount, so that the distance between the interior sides of the same is substantially commensurate with the width of the U-shaped portion of brake arm 4. Brake arm 4 is received between plate flanges 59, thereby interconnecting the two members, so that lower plate 52 pivots with the caster 1 about spindle 30. A circular aperture 60 is positioned through the base 58 of lower plate 52, and has a diameter slightly larger than the diagonal distance of foot 9, such that the lower plate 53 can freely pivot with the caster 1 with respect to the bed foot. Lugs or tabs 61 protrude upwardly from the base 58 of lower plate 52, and are arranged in a circular, circumferentially spaced pattern which is coaxial with caster spindle 30 and aperture 60. In this example, six tabs 61 are provided, three on each end of the plate, and are spaced regularly apart a distance in the nature of 30°. The illustrated tabs 61 have a substantially elliptical shape.

The upper plate 53 (FIGS. 4 and 6) is disc-shaped and includes a square aperture 64 through the center thereof which mates with foot 9, and slideably mounts the same thereon and keys the plate to the leg so that the same rotate together. Aperture 64 permits upper plate 53 to slide vertically on foot 10, but is sufficiently small to insure abutting engagement between leg end edge 21 and upper plate 53 when the same are converged. A plurality of recesses 65 (FIG. 4), which are shaped to receive tabs 61 therein, are positioned on the lower side of upper plate 53. In this example, upper plate 53 includes 12 recesses 65, which are elliptically shaped, and spaced regularly around the plate in intervals of approximately 30°. Other pivot lock arrangements, such as friction plates, and the like, can be used. However, the lug and recess design of the present invention provides positive interlocking. Two leaf springs 54 are attached to opposite sides of lower plate 52 by fasteners 68, and resiliently urge plates 52 and 53 apart into a nonengaged position. The resiliency or stiffness of leaf spring 54 is preferably considerably less than that of coil spring 43, whereby as force is applied to upper plate 53 by descending bed leg 9, the leaf springs are the first to be overcome, so that plates 53 and 54 converge into a locked position before caster wheel brake 3 is engaged.

Figure 7:
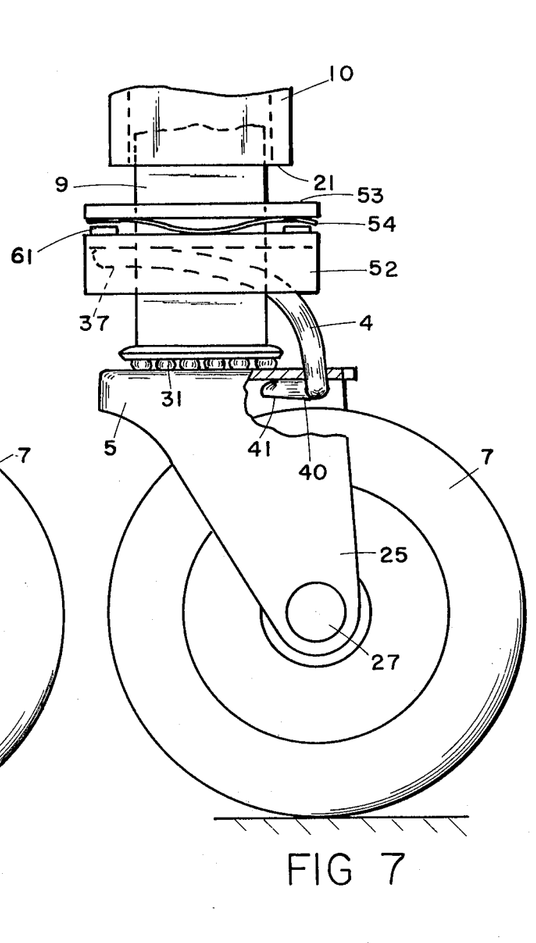
FIG. 7 is a side elevational view of the swivel lock caster, shown in a fully unlocked condition.
Figure 8:
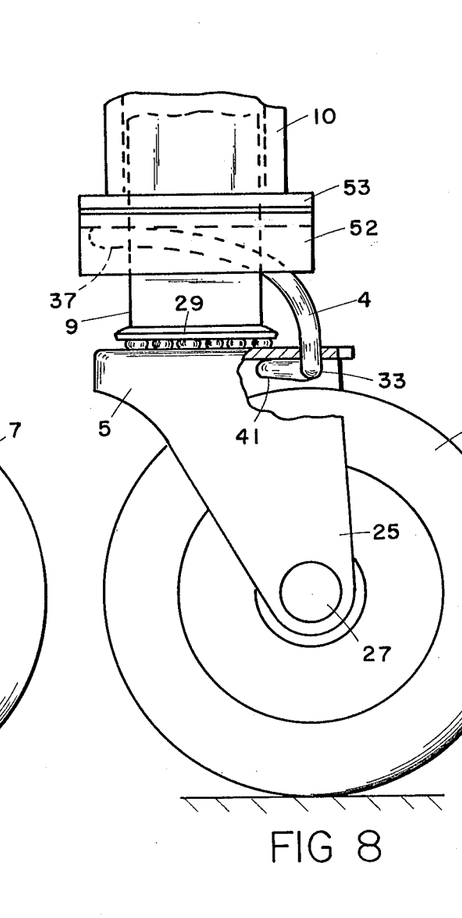
FIG. 8 is a side elevational view of the swivel lock caster, shown with the pivot lock engaged.
Figure 9:
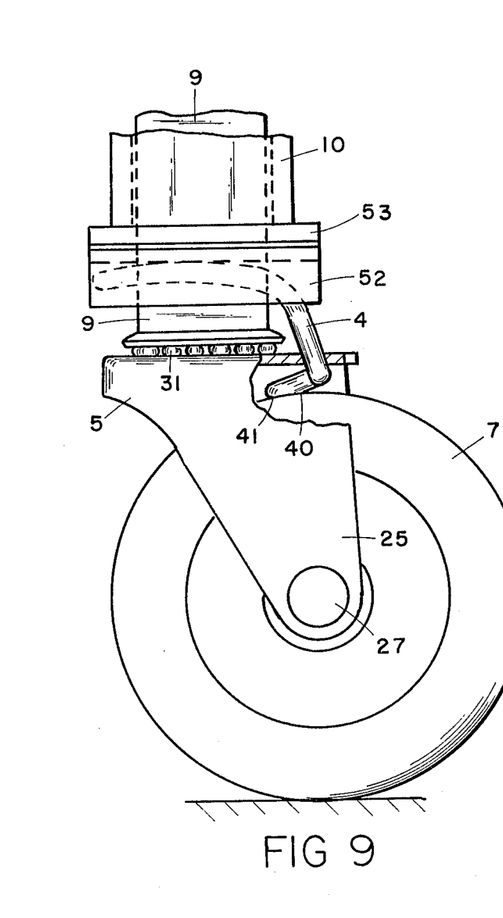
FIG. 9 is a side elevational view of the swivel lock caster, with both the pivot and rotative locks engaged.

In use, when bed 2 is in a raised position (FIG. 7) the lower ends 21 of the bed legs 10 are spaced apart from the upper plate 52. In this position, caster wheels 7 are free to rotate about pin 27, and the casters 1 can bodily pivot in a horizontal plane about the associated spindle and upper race 29 on ball bearing 31. When bed 2 is lowered, the lower ends 21 of telescoping feet 9 engage the upper plates 52 and push the brake assemblies downwardly. In each caster, the stiffness of leaf springs 54 is substantially less than that of coil spring 43, so that the downward force applied to upper plate 52 causes the upper and lower plates to converge. The tabs 61 are received in the mating recesses 65, and the plates are thereby engaged and locked together to prevent mutual rotation. If the tabs 61 and recesses 65 are not perfectly aligned when the plates are converged, slight swiveling of the caster will cause the plates to lock into place. Since the upper plate is keyed to the foot 9, the angular position or swivel of the caster is locked. In this position, the caster wheel brake 3 is not engaged, and wheel 7 can rotate freely. The locking of the caster swivel greatly improves the stability of the bed in the stationary, braked condition. Although a caster 1 could be mounted on each bed leg 10 to achieve this feature, it has been determined that secure bed anchoring can be accomplished with only two locking casters 1, wherein the casters are mounted on diagonally opposite legs. This arrangement reduces the overall cost of the bed, while providing a very positive lock.

Alternatively, to improve steering of the bed during port, two casters 1 are attached to the forward or lead legs of the bed. The swivel function of the casters 1 are locked when the bed is moving, and the rear casters are free to pivot so that the attendant can readily move the rear end of the bed from side to side, and thereby steer the bed. This arrangement improves the steering and control of the bed when it is rolled over the floor.

Further lowering of bed 2 from the locked swivel position described above rotates brake arm 4 into a position wherein the flat abutting arm segment 41 engages the periphery of caster wheel 7 and locks the same in place. Preferably, the vertical adjustment of the bed is designed so that in the fully down position, only a preselected portion of the bed weight, including the weight of the patient, is applied to the brake assemblies. In this manner, the total bed weight is not supported solely on the four brake arms 4. The raising or elevating of bed 2 releases the rotational and pivot locks in the reverse order described above, such that vertical adjustment of bed 2 automatically locks both the pivot and rotation of each of casters 1.

The lock arrangement provides a mechanism which locks the caster wheels against both rotation and pivoting and operates automatically upon raising and lowering the bed, thereby eliminating any manual manipulation of treadle mechanisms or the like. The lock arrangement securely locks the casters in place, and can be easily and quickly manipulated from one position to another.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a caster having a ground engaging wheel rotatably mounted in a housing and an upstanding spindle for connecting said caster with an article supported by said caster, a wheel brake comprising:
   a control arm pivotally mounted in said caster housing at a pivot point; said control arm having an interior end with a portion thereof eccentric to said pivot point and extending over the periphery of said wheel, and an exterior end that is U-shaped, with an arcuate center portion thereof extending substantially concentrically about said spindle, whereby downward force on said arm exterior end rotates said interior end into abutment with the periphery of said wheel and securely locks said wheel in place; and a coil spring wound about a terminal segment of said arm exterior end, and having one end thereof connected with said caster housing for resiliently urging said control arm toward and normally retaining the same in a disengaged condition with said wheel.

2. A caster as set forth in claim 1, including:
a washer adapted for slidable mounting on a leg portion of the article, and being abuttingly supported on the U-shaped portion of said control arm.

3. In a vertically adjustable bed having legs with telescoping feet to raise and lower said bed, a caster, comprising:
a caster housing having a ground engaging wheel rotatably mounted therein, and means connecting said caster with one of said telescoping feet;
a brake arm pivotally mounted in said caster housing at a pivot point; said brake arm having an interior end with a portion thereof eccentric with said pivot point and extending over the periphery of said wheel, and an exterior end with a portion thereof disposed laterally offset from said pivot point, and extending adjacent an associated one of said legs to which said caster is connected, whereby retraction of the telescoping foot associated with said one leg engages said one leg with said brake arm, applies downward force on said arm exterior end, and rotates said arm interior end into abutment with the periphery of said wheel to securely lock said wheel in place.

4. A caster as set forth in claim 3, wherein:
said control arm exterior end is U-shaped, with an arcuate center portion thereof extending substantially concentrically about said foot.

5. An adjustable bed as set forth in claim 4, including:
a washer slideably mounted on said telescoping foot and shaped to abuttingly overlie said U-shaped arm portion to insure engagement between said leg and said brake arm.

6. In a caster having a ground engaging wheel rotatably mounted in a housing, and upstanding means for connecting said caster with a vertically adjustable article supported by said caster, a wheel brake comprising:
a control arm pivotally mounted in said caster housing at a pivot point; said control arm having an interior end with a portion thereof eccentric to said pivot point and extending over the periphery of said wheel, and an exterior end with a portion thereof disposed laterally offset from said pivot point and extending adjacent said connecting means, whereby downward force on said arm exterior end rotates said interior end into abutment with the periphery of said wheel and securely locks said wheel in place;
a first plate shaped for slideable mounting on a foot portion of the vertically adjustable article, and including means for keying said plate on said foot portion to rotate together;
a second plate operably connected with said caster for pivoting therewith, and disposed in line with said first plate; said first and second plates having adjacent faces, with means thereon for locking the same together when converged to prevent relative pivotal motion; one of said plates includes at least one protruding tab, and the other of said plates includes at least one recessed aperture shaped to receive said tab therein and lock said plates together in an engaged position against relative pivotal motion;
means for resiliently urging said plates apart to a nonengaged position to permit pivotal motion therebetween; and
means for engaging a vertically translating portion of said vertically adjustable article, whereby raising and lowering said article simultaneously diverges and converges said plates between the engaged and nonengaged position.

7. A caster as set forth in claim 6, wherein:
said plate locking means comprises at least one protruding tab on one of said faces, and with the other face including at least one recessed aperture shaped to receive and retain said tab therein for positively locking said plates together.

8. A caster as set forth in claim 7, wherein:
said first plate is abuttingly supported on said control arm.

9. A caster as set forth in claim 7, including:
means for resiliently urging said control arm toward and normally retaining the same in a disengaged condition with said wheel.

10. A caster as set forth in claim 9, wherein:
said control arm resilient means is stiffer than said plate resilient means, whereby an initial descent of the bed converges said plates and effects caster swivel locking while permitting caster wheel rotation, and continued bed descent manipulates said control arm and locks said wheel against rotative motion.

11. In a caster for a vertically adjustable bed, a swivel lock comprising:
a first plate adapted for mounting on a leg of the bed, and including means for keying said plate on the bed leg;
a second plate operably connected with said caster for pivoting therewith, and disposed in line with said first plate; said first and second plates having adjacent faces with means thereon for locking the same together and preventing relative pivotal motion therebetween when said plates are converged;
means for retaining said plates apart in a nonengaged position to permit pivotal motion therebetween; and
means for engaging a vertically translating portion of the adjustable bed, whereby raising and lowering the bed simultaneously diverges and converges said plates between the engaged and nonengaged positions.

12. A caster as set forth in claim 11, wherein:
said plate locking means comprises at least one protruding tab on one of said faces, and with the other face including at least one recessed aperture shaped to receive and retain said tab therein for positively locking said plates together.

13. A caster as set forth in claim 12, wherein:
said first plate includes means for slideably mounting the same on said leg; and
said retaining means comprises a pair of leaf springs.

14. A caster as set forth in claim 12, wherein:

said first plates includes an upper surface adapted to abut a lower end edge of a telescoping bed leg and thereby define said engaging means.

15. A caster as set forth in claim 12, wherein:
said first plate includes a plurality of one of said tab and aperture spaced radially about the margin of said first plate.

16. An adjustable bed as set forth in claim 15, wherein:
said plate locking means comprises at least one protruding tab on one of said faces, and with the other face including at least one recessed aperture shaped to receive and retain said tab therein for positively locking said plates together.

17. An adjustable bed as set forth in claim 16, wherein said casters include a ground engaging wheel rotatably mounted in a housing, a brake, comprising:
a control arm pivotally mounted in said caster housing at a pivot point; said control arm having an interior end with a portion thereof eccentric to said pivot point and extending over the periphery of said wheel, and an exterior end with a portion thereof disposed vertically offset from said pivot point and extending adjacent the associated telescoping one foot, whereby downward force applied by said one foot to said arm exterior end rotates said interior end into abutment with the periphery of said wheel and securely locks said wheel in place.

18. An adjustable bed as set forth in claim 17, wherein:
said control arm includes resilient means normally retaining said control arm in an unlocked position;
said first plate is slideably mounted on said one foot;
said plate urging means comprises resilient means; and
said control arm resilient means is stiffer than said plate resilient means, whereby initial leg retraction engages said plates and causes caster swivel locking while permitting wheel rotation, and continued leg retraction manipulates said control arm and locks said wheel against rotative motion.

19. In a vertically adjustable bed having legs with telescoping feet to raise and lower said bed, and including casters mounted in said telescoping feet, a caster swivel lock comprising:
a first plate keyed on one of said telescoping feet;
a second plate operably connected with the caster on said one foot for pivoting therewith, and disposed in line with said first plate; said first and second plates having adjacent faces, with means thereon for locking the same together and preventing relative pivotal motion therebetween when said plates are converged; and
means for moving said plates apart to a nonengaged position to permit pivotal motion therebetween, whereby extension and retraction of said telescoping feet both raises and lowers said bed, and simultaneously diverges and converges said pivot locking plates between the engaged and nonengaged positions.

20. A caster for vertically adjustable beds and the like, comprising:
a housing having a ground engaging wheel rotatably mounted therein;
means for mounting said housing in a leg of a vertically adjustable bed and permitting said housing and wheel to swivel therein;
a brake arm pivotally mounted in said housing and having one end thereof extending over and selectively abutting the periphery of said wheel, and the other end shaped for abutment with a vertically translating portion of said bed for pivoting said brake arm between locked and unlocked positions;
a swivel lock having a first member operably connected with said housing and swiveling therewith, and a second member cooperating with said first member and adapted for connection with the adjustable bed leg; said first and second members having adjacent faces with means for pivotally interlocking the same in an abutting position; one of said first and second members being adapted for engagement with a vertically translating portion of said bed for converging and diverging said members between locked and unlocked positions, whereby both caster swivel and wheel rotation are automatically controlled by adjusting the elevation of the bed.

21. In combination, a vertically adjustable bed or the like, and a caster therefor, comprising:
a housing having a ground engaging wheel rotatably mounted therein;
means for mounting said housing in a leg of said vertically adjustable bed and permitting said housing and wheel to swivel therein;
a brake arm pivotally mounted in said housing and having one end thereof extending over and selectively abutting the periphery of said wheel, and the other end selectively abutting a vertically translating portion of said bed and pivoting said brake arm between locked and unlocked positions;
a swivel lock having a first member operably connected with said housing and swiveling therewith, and a second member cooperating with said first member and connected with said bed leg; said first and second members having adjacent faces with means for pivotally interlocking the same in an abutting position; one of said first and second members selectively abutting a vertically translating portion of said bed and converging and diverging said members between locked and unlocked position, whereby both caster swivel and wheel rotation are automatically controlled by adjusting the elevation of said bed.

22. A caster for vertically adjustable beds and the like, comprising:
a caster housing;
a ground engaging wheel rotatably mounted in said caster housing;
a spindle mounted on and upstanding from said caster housing, and being shaped for connecting said caster with a bed;
a wheel brake, comprising a control arm pivotally mounted in said caster housing at a pivot point; said control arm having an interior end with a portion thereof eccentric to said pivot point and extending over the periphery of said wheel, and an exterior end that is generally U-shaped, with an arcuate center portion thereof extending substantially concentrically about said spindle and laterally offset from said pivot point for engaging a vertically translating portion of the bed, whereby downward adjustment of the bed applies downward force to said arm exterior end and thereby rotates said interior end into abutment with the periphery of said wheel and securely locks said wheel in place.

23. A caster as set forth in claim 22, including:
means for resiliently urging said control arm toward and normally retaining the same in a disengaged condition with said wheel.

24. A caster as set forth in claim 23, wherein:
said resilient means comprises a coil spring wound about a terminal segment of said arm exterior end, and having one end thereof connected with said caster housing.

25. A caster as set forth in claim 22 or 24, including:
a washer adapted for slideable mounting on a leg portion of the article, and being abuttingly supported on the U-shaped portion of said control arm.

* * * * *

UNITED STATES PATENT AND TRADEMARK OFFICE
CERTIFICATE OF CORRECTION

PATENT NO. : 4,385,414
DATED : May 31, 1983
INVENTOR(S) : Frank M. Damico

It is certified that error appears in the above-identified patent and that said Letters Patent is hereby corrected as shown below:

Column 5, line 40:
   "foot 10" should be -- foot 9 --

Column 5, line 57:
   "leg 9" should be -- leg 10 --

Column 5, line 58:
   "plates 53 and 54" should be -- plates 52 and 53 --

Column 6, line 22:
   "port" should be -- transport --

Column 9, line 1:
   "plates" should be -- plate --.

Signed and Sealed this

Twenty-first Day of February 1984

[SEAL]

Attest:

GERALD J. MOSSINGHOFF

Attesting Officer   Commissioner of Patents and Trademarks